United States Patent
Kojima et al.

(10) Patent No.: US 8,714,752 B2
(45) Date of Patent: May 6, 2014

(54) PROJECTION DISPLAY DEVICE

(75) Inventors: Kuniko Kojima, Tokyo (JP); Hayato Takeuchi, Tokyo (JP); Akihiro Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/641,471

(22) PCT Filed: Aug. 18, 2011

(86) PCT No.: PCT/JP2011/068680
§ 371 (c)(1),
(2), (4) Date: Oct. 16, 2012

(87) PCT Pub. No.: WO2012/026390
PCT Pub. Date: Mar. 1, 2012

(65) Prior Publication Data
US 2013/0038846 A1 Feb. 14, 2013

(30) Foreign Application Priority Data
Aug. 23, 2010 (JP) .................................. 2010-186024

(51) Int. Cl.
*G03B 21/14* (2006.01)
(52) U.S. Cl.
USPC .................. 353/88; 353/30; 353/31; 353/38; 353/97; 353/98; 348/744; 349/5; 349/7
(58) Field of Classification Search
USPC .............. 353/30, 31, 37, 38, 88, 97, 98–99; 348/744–747, E5.143, E9.027; 359/738–741; 349/738–741
See application file for complete search history.

(56) References Cited

U.S. PATENT DOCUMENTS

| | | | |
|---|---|---|---|
| 5,103,302 A | | 4/1992 | Yoshida et al. |
| 5,829,858 A | * | 11/1998 | Levis et al. .................... 353/122 |
| 2003/0202259 A1 | | 10/2003 | Nishimae et al. |
| 2005/0073659 A1 | | 4/2005 | Sannohe et al. |
| 2005/0094291 A1 | | 5/2005 | Onishi et al. |
| 2007/0064203 A1 | * | 3/2007 | Sawai .............................. 353/97 |
| 2008/0043208 A1 | | 2/2008 | Chang |
| 2009/0091736 A1 | | 4/2009 | Yamazoe |
| 2009/0168041 A1 | * | 7/2009 | Sawai .............................. 355/71 |

FOREIGN PATENT DOCUMENTS

| | | |
|---|---|---|
| JP | 2-216983 A | 8/1990 |
| JP | 2002-156703 A | 5/2002 |
| JP | 2003-322822 A | 11/2003 |

(Continued)

*Primary Examiner* — Sultan Chowdhury
(74) *Attorney, Agent, or Firm* — Birch, Stewart, Kolasch & Birch, LLP

(57) ABSTRACT

A projection display device has an illumination optical system that includes a light-intensity equalization element, a first optical system, and an aperture regulation member. The aperture regulation member is disposed at a position that is not optically conjugate with the screen, and the aperture regulation member has at least one of the following, using measured or calculated relative illuminances at each of multiple segments of the image formation region or screen: an aperture expansion part provided at a position corresponding to a segment with a low relative illuminance, the aperture expansion part being a cutout that narrows the light-blocking section and widens the aperture section; an aperture contraction part provided at a position corresponding to a segment with a high relative illuminance, the aperture contraction part being a protrusion that widens the light-blocking section and narrows the aperture section.

8 Claims, 15 Drawing Sheets

(56) References Cited

FOREIGN PATENT DOCUMENTS

| | | |
|---|---|---|
| JP | 2004-157346 A | 6/2004 |
| JP | 2005-134522 A | 5/2005 |
| JP | 3685794 B2 | 8/2005 |
| JP | 2006-85054 A | 3/2006 |
| JP | 2007-233003 A | 9/2007 |
| TW | 200811470 A | 3/2008 |
| TW | 200931191 A | 7/2009 |
| WO | WO 02/088841 A1 | 11/2002 |

* cited by examiner

FIG. 4

| DIFFRACTION ANGLE PITCH $\beta$ [°] | | | |
|---|---|---|---|
| WAVELENGTH $\lambda$ / PIXEL SPACING d | $\lambda$ = 630 nm | $\lambda$ = 53 nm | $\lambda$ = 470 nm |
| d = 13.7 $\mu$m | 2.64 ° | 2.22 ° | 1.97 ° |
| d = 7.6 $\mu$m | 4.75 ° | 4.00 ° | 3.55 ° |

PROJECTION DISPLAY DEVICE

TECHNICAL FIELD

The present invention relates to a projection display device that displays an image by projecting a beam of light modulated by a light valve onto a screen.

BACKGROUND ART

Reducing the parts count of optical systems and limiting the use of aspheric lenses in order to reduce the size and cost of the optics generally leads to greater aberrations in the optical systems and more uneven illuminance and color on the image display surface of the screen. Here, uneven illuminance means a distribution, mapped with respect to position expressed in two dimensions in an arbitrary plane, that shows highs and lows of illuminance (a non-uniform illuminance distribution), and uneven color means a distribution, mapped with respect to position expressed in two dimensions in an arbitrary plane, that shows color variations (a non-uniform chromaticity distribution).

Along with the recent increasing resolution and decreasing size of light valves has come a reduction in the spacing of their pixels. In a light valve, such as a digital micromirror device (DMD, a registered trademark), in which light is reflected by a periodic structure, diffraction occurs in addition to regular reflection. The diffraction angle pitch of the diffracted light increases with decreasing spacing of the pixels. The more finely spaced the pixels are, accordingly, the more difficult it becomes for high-order diffracted light to enter the projection optics, and the less diffracted light can be used for image projection. In addition, if there are large differences in the amount of incident light or its angle of incidence within the image formation region of the light valve (the illuminated area), differences in the amount of diffracted light in the entrance plane of the projection optics become large, resulting in increased illuminance unevenness and color unevenness on the image display surface of the screen.

In projection display devices for home theater use, because of demands for higher contrast, the optics are frequently configured with a reduced aperture diameter and a high F-number (FNO), and the amount of light is adjusted by providing baffles on the light paths in the optical system. Reducing the aperture diameter of the optical system reduces the amount of diffracted light that enters the optical system, however, which tends to increase the effect, on the image display surface of the screen, of uneven illuminance and color due to the effect of optical aberration and the effect of the finer spacing in the light valve.

To suppress illuminance unevenness and color unevenness on the image display surface of the screen, devices that use baffles having apertures with shapes that surround the beam range of light rays separated into multiple color components have been proposed (see, for example, Patent Reference 1).

PRIOR ART REFERENCES

Patent References

Japanese Patent Application Publication No. 2007-233003 (e.g., paragraph 0029)

SUMMARY OF THE INVENTION

Problems to be Solved by the Invention

To reduce the illuminance unevenness and color unevenness on the image display surface of the screen that occur due to the effects of aberration in the optics and the increasingly fine spacing in the light valve, however, it is necessary to correct the illuminance distribution of the light beam incident on the image formation region of the light valve. For this reason, conventional devices that use baffles having apertures with shapes that surround the beam range of light rays separated into multiple color components cannot appropriately reduce illuminance unevenness and color unevenness in the image display surface of the screen.

The present invention addresses this problem with the object of providing a projection display device that can appropriately correct the illuminance distribution on the image display surface of the screen.

Means for Solving the Problem

A projection display device according to the present invention includes a light source for emitting a light beam, a light valve having an image formation region for forming an image responsive to input image information, an illumination optical system for directing the light beam onto the image formation region of the light valve, and a projection optical system for projecting the light beam, as modulated by the image formed in the image formation region of the light valve, onto the image display surface of a screen. The illumination optical system includes a light intensity equalization element for equalizing the intensity distribution of the light beam emitted from the light source, a first optical system for guiding the light beam equalized by the light intensity equalization element to the image formation region, and an aperture regulation member provided on a path of propagation of the light beam in the first optical system, having a light blocking section for blocking the light beam and an aperture section for passing the light beam. The aperture regulation member is disposed in a position not having an optically conjugate relation to the screen, and has at least one of an aperture expansion part and an aperture contraction part. The aperture expansion part is a cutout region that narrows the light blocking section and widens the aperture section, provided at a position corresponding to a segment of relatively low illuminance, among a plurality of segments obtained by partitioning the image formation region or the image display surface of the screen, using measured or calculated relative illuminance values. The aperture contraction part is a protrusion that widens the light-blocking section and narrows the aperture section, provided at a position corresponding to a segment of relatively high illuminance, among the plurality of segments.

Effects of the Invention

According to the present invention, the illuminance distribution on the image display surface of the screen can be corrected with a simple structure.

BRIEF DESCRIPTION OF THE DRAWINGS

FIG. 4 describes the diffraction angle pitch of the light diffracted from the DMD in the first to third embodiments.

MODE FOR CARRYING OUT THE INVENTION

First Embodiment

Figure 1:
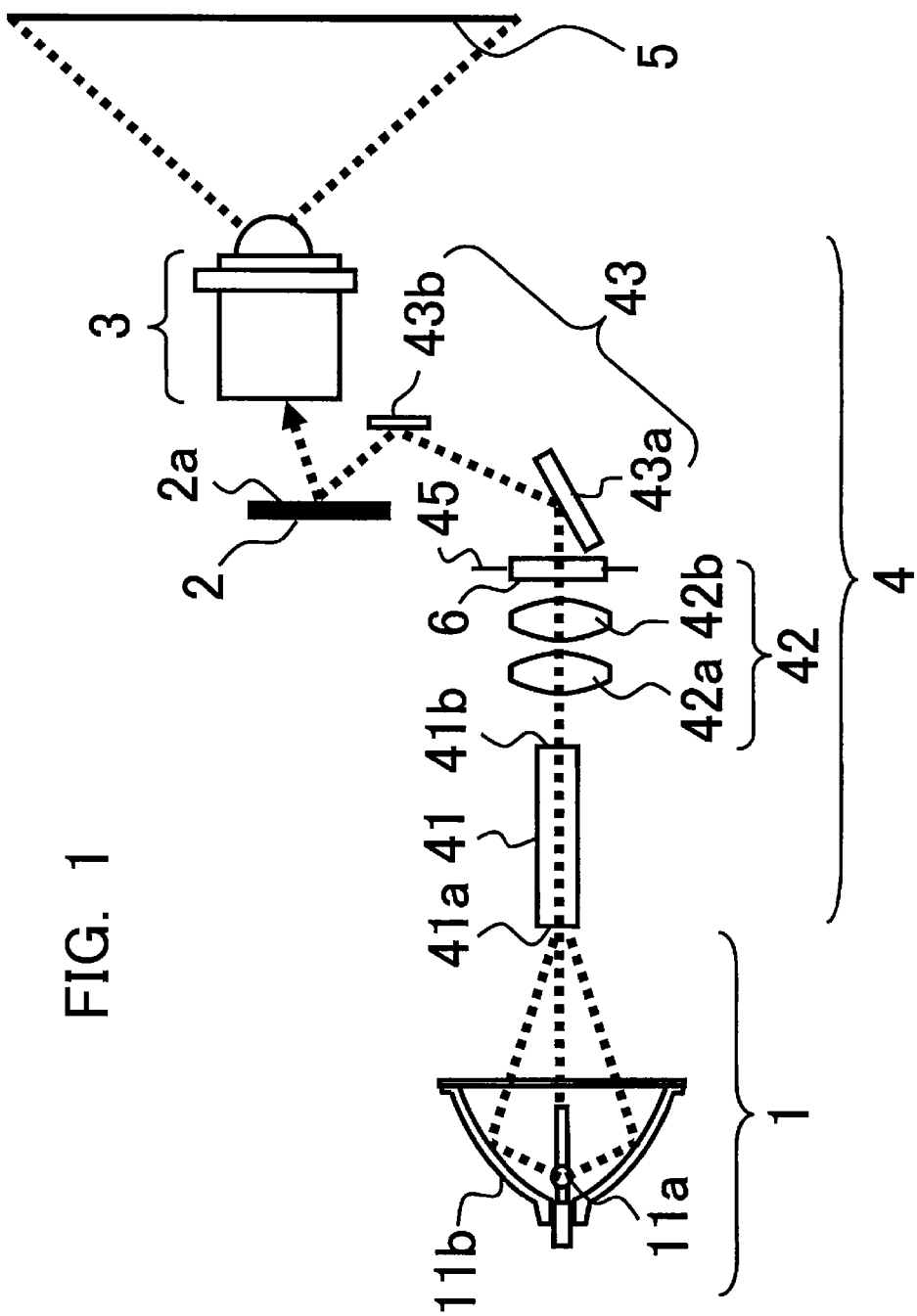
FIG. 1 schematically illustrates the structure of the optical system of a projection display device according to first to third embodiments of the invention.

FIG. 1 schematically illustrates the structure of the optical system of a projection display device according to the first to third embodiments of the invention. As shown in FIG. 1, the projection display device in the first embodiment has a source lamp 1 used as a light source for emitting a light beam (indicated by dotted lines in the drawing), a DMD element 2 used as a light valve having an image formation region (illuminated surface) 2a for forming an image according to input image information, an illumination optical system 4 for guiding the light beam emitted from the source lamp 1 onto the image formation region 2a of the DMD element 2, and a projection optical system 3 for expanding the light beam modulated by the image formed in the image formation region 2a of the DMD element 2 and projecting it onto a screen 5.

The source lamp 1 includes, for example, a light emitting element 11a for emitting white light and an elliptical mirror 11b disposed around the light emitting element 11a. The elliptical mirror 11b reflects a light beam emitted from a first focal point corresponding one focus of the ellipse and makes the beam converge to a second focal point corresponding to the other focus of the ellipse. The light emitting element 11a is disposed near the first focal point of the elliptical mirror 11b; the light beam emitted from the light emitting element 11a converges to a point near the second focal point of the elliptical mirror 11b. A parabolic mirror may be used instead of the elliptical mirror 11b. In that case the light beam emitted from the light emitting element 11a may be substantially collimated by the parabolic mirror, and then converged by a condenser lens (not shown). A concave mirror of a type other than a parabolic mirror may be used in place of the elliptical mirror 11b.

The illumination optical system 4 includes a light-intensity equalization element 41 for equalizing the intensity distribution of the light beam emitted from the source lamp 1 (the distribution of optical intensity within a plane perpendicular to the direction of propagation of the beam), a first optical system for guiding the light beam equalized by the light-intensity equalization element 41 to the image formation region 2a of the DMD element 2, and an aperture regulation member 6 or 61 disposed on the path of propagation of the light beam equalized by the light-intensity equalization element 41. The aperture regulation member 6 or 61 has a light-blocking section for blocking the light beam and an aperture section for passing the light beam. The first optical system includes a relay lens group 42 as a second optical system including lenses 42a and 42b and a mirror group 43 as a third optical system including a first mirror 43a and a second mirror 43b. In FIG. 1, the relay lens group 42 is formed by two lenses 42a and 42b, but the number of lenses is not limited to two. The light beam exiting the light-intensity equalization element 41 is guided by the relay lens group 42 and mirror group 43 to the image formation region 2a of the DMD element 2.

The light-intensity equalization element 41 has the function of equalizing the optical intensity of the light beam emitted from the source lamp 1. This function of equalizing the light intensity reduces illuminance unevenness. A general example of the light-intensity equalization element 41 is a polygonal columnar rod made from a transparent material such as glass or plastic and structured so that the inner sides of its side walls are totally reflecting surfaces. The polygonal columnar rod is a columnar member with a polygonal cross-sectional shape. Another example of the light-intensity equalization element 41 is a pipe (tube member) made of mirror-like members joined into a tube with a polygonal cross-sectional shape, with the light reflecting surfaces on the inside. A light-intensity equalization element 41 of the polygonal columnar rod type reflects light several times by use of total reflection at the interface between the transparent material and air before transmitting the light from its exit surface (exit end). A light-intensity equalization element 41 of the polygonal pipe type exploits the reflective action of the inwardly facing mirrors (e.g., front surface mirrors) to reflect light several times before delivering the light from the exit plane.

In the light-intensity equalization element 41, if an appropriate distance is secured in the beam propagation direction, light that has undergone multiple internal reflections illuminates the exit plane 41b of the light-intensity equalization element 41 in a superimposed manner. A substantially uniform optical intensity distribution can therefore be achieved in the vicinity of the exit plane 41b of the light-intensity equalization element 41. Light output from the exit plane 41b with such a substantially uniform intensity distribution is guided to the DMD element 2 by the relay lens group 42 and mirror group 43 and illuminates the image formation region 2a of the DMD element 2.

Figure 8:
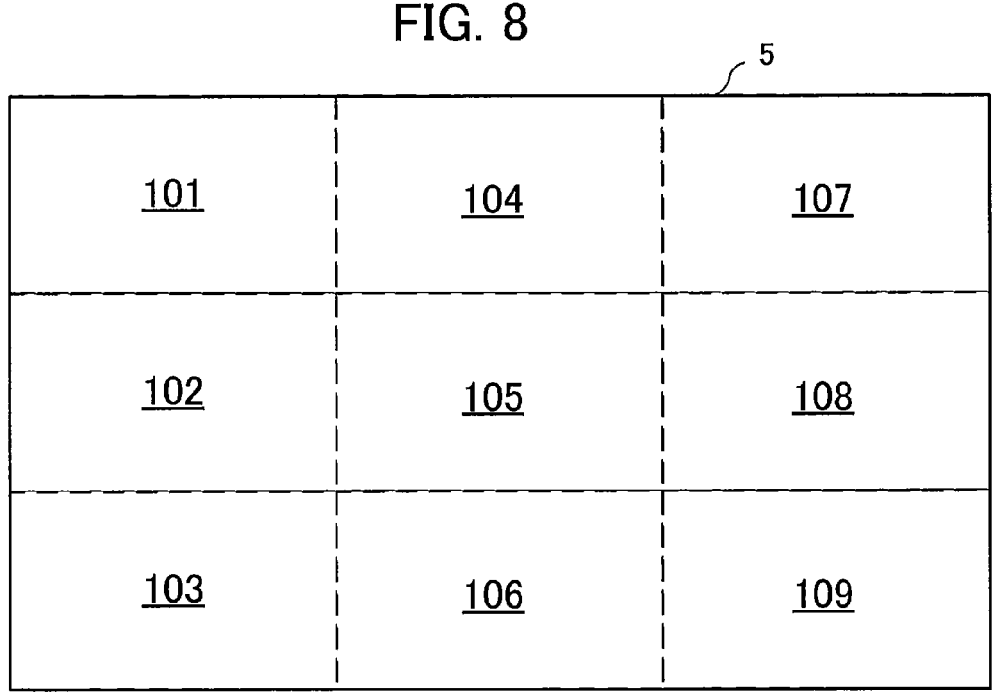
FIG. 8 shows an example of the partitioning of the image display surface of the screen into segments in the first to third embodiments.

The aperture regulation member 6 or 61 is disposed at a position that is not optically conjugate to the screen 5. Using measured or calculated values of relative illuminance in a plurality of segments (indicated by reference numerals 101 to 109 in FIG. 8, described later) obtained by partitioning the image display surface of the screen 5, the aperture regulation member 6 or 61 is provided with at least one of an aperture expansion part disposed at a position corresponding to a segment with a relatively low illuminance among the plurality of segments, and an aperture contraction part disposed at a position corresponding to a segment with a relatively high illuminance among the plurality of segments. The aperture expansion part (e.g., element 61b in FIG. 11, described later) is a cutout region that narrows the light blocking section and widens the aperture section; the aperture contraction part (e.g., element 63d in FIG. 15, described later) is a protrusion for widening the light-blocking section and narrowing the size of the aperture section. Instead of measured or calculated values of the relative illuminance in the plurality of segments (indicated by reference numerals 101 to 109 in FIG. 8, which will be described later) obtained by partitioning the image display surface of the screen 5, measured values or calculated values of the relative illuminance in a plurality of segments obtained by partitioning the image formation region of the light valve may be used.

The aperture regulation member 6 or 61 is preferably disposed at or in a vicinity of a position optically conjugate with the projection optics aperture on the light beam entrance side of the projection optical system 3. This is because the diameter of the light beam is minimal at this optically conjugate position and accordingly the size of the aperture regulation member 6 or 61 can be reduced easily.

Figure 2:
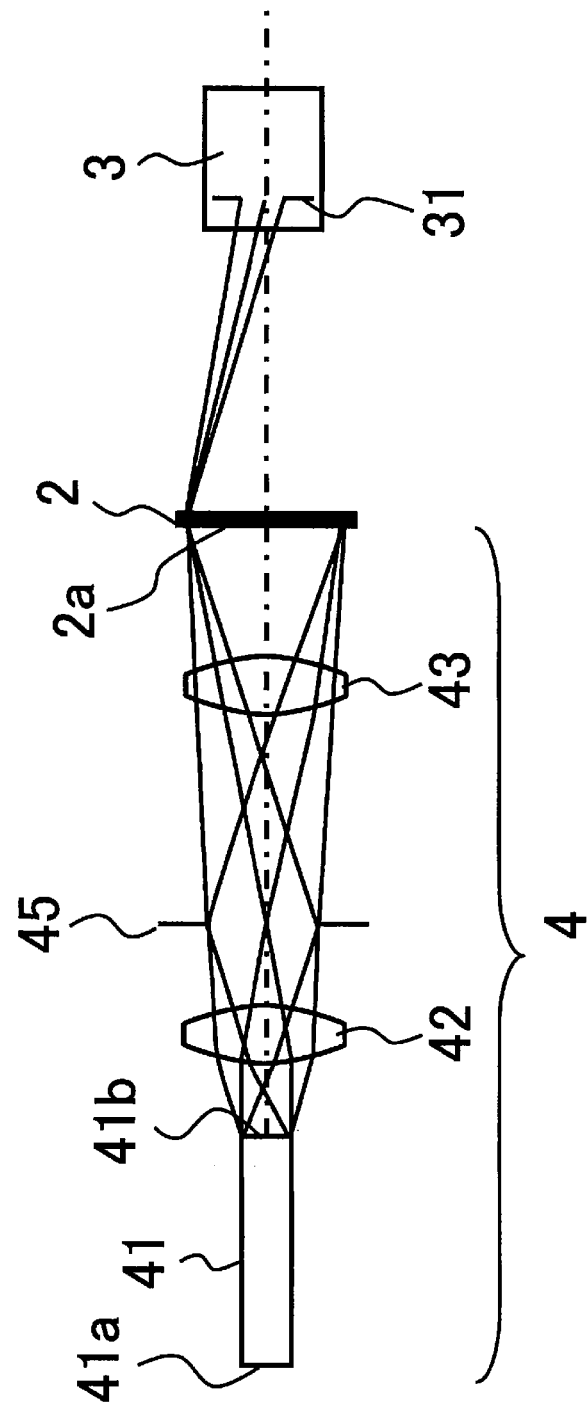
FIG. 2 is a schematic diagram illustrating the baffle position in the illumination optical system in the first to third embodiments.

FIG. 2 is a schematic diagram conceptually illustrating the effect of the illumination optical system 4. In FIG. 2, in order to schematically illustrate the relay lens group 42 and mirror group 43, both are depicted as unitary lens elements, but in practice they may be groups of multiple lenses. In the first embodiment, the illumination optical system 4 is configured so that the exit plane 41b of the light-intensity equalization element 41 and the image formation region 2a of the DMD element 2 are in an optically conjugate relation. In the illumination optical system 4, the position that is optically conjugate with the entrance aperture 31 of the projection optical system 3 is referred to as the baffle position 45 of the illumination optical system 4.

The baffle position 45 of the illumination optical system 4 is a position at which the principal rays of the light beam output from the light-intensity equalization element 41 substantially converge. The baffle position 45 is conjugate or substantially conjugate with the entrance aperture 31 on the entrance side of the projection optical system 3, as well as with the entrance plane 41a of the light-intensity equalization element 41. Then even if, for example, the light beam is partially blocked (e.g., part of the light beam is blocked by a light blocking member) at the baffle position 45 of the illumination optical system 4 and the position of the entrance plane 41a of the light-intensity equalization element 41, although the luminance of the image displayed on the projection display device decreases, defects such as the display of an incomplete image (e.g., an image with a dark or black region appearing in the vicinity of a corner or side of the display screen) are unlikely to occur.

The DMD element 2 is structured as a planer arrangement of a number of (e.g., several hundred thousand) movable micromirrors corresponding to individual pixels. The DMD element 2 causes the individual slope angles (tilts) of the plurality of micromirrors to vary according to pixel information (input image information), thereby modulating the light beam responsive to the image. The modulated light beam is projected onto the image display surface of the screen 5 to display an image on the screen. In other words, the DMD element 2 is a reflective light valve that reflects incident light according to pixel information to output modulated light for forming an optical image.

The DMD element 2 tilts a micromirror selected according to the image information from among the plurality of micromirrors by an angle $\alpha$ (e.g., 12 degrees) with respect to the reference surface in a certain direction. A light bundle incident on a micromirror tilted by this angle $\alpha$ is reflected towards the projection optical system 3. A light bundle entering the projection optical system 3 at an inclination of angle $\alpha$ is projected onto the image display surface of the screen 5, where the image is formed. The reference surface of the micromirror is the reflecting surface of the micromirror in the state in which the mirror is not actuated. That is, the reference surface of the micromirror is a surface facing in the same direction as the surface of the substrate on which the micromirror is formed. A light bundle incident on a micromirror that is not tilted with respect to the reference surface in the DMD element 2 is reflected in a direction having no effect on the image displayed on the screen 5, and may be directed toward a light absorbing plate (not shown), for example. Light bundles incident on the light absorbing plate are not used to form the image on the image display surface of the screen 5. A micromirror is not tilted with respect to the reference surface when the micromirror is not actuated.

Figure 3A:
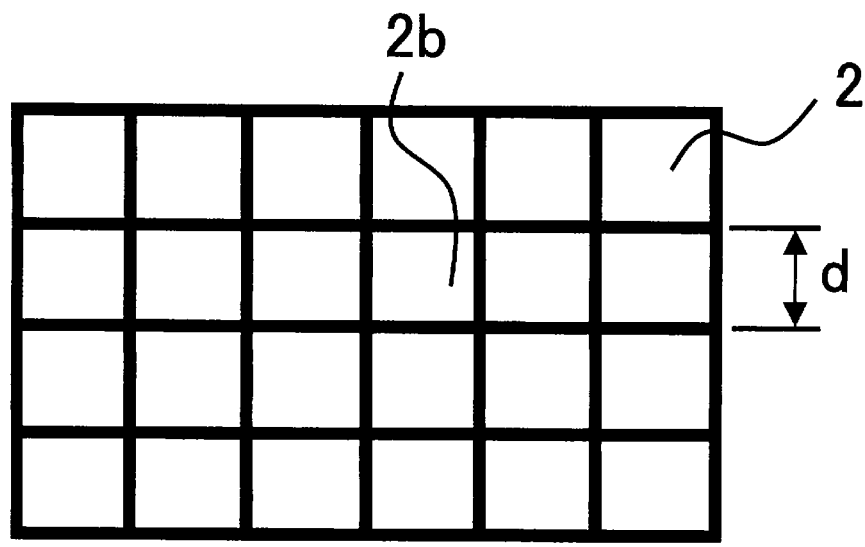
FIGS. 3(a) and 3(b) are a frontal view schematically illustrating some of the micromirrors in a DMD in the first to third embodiments and a schematic diagram illustrating diffracted light.
Figure 3B:
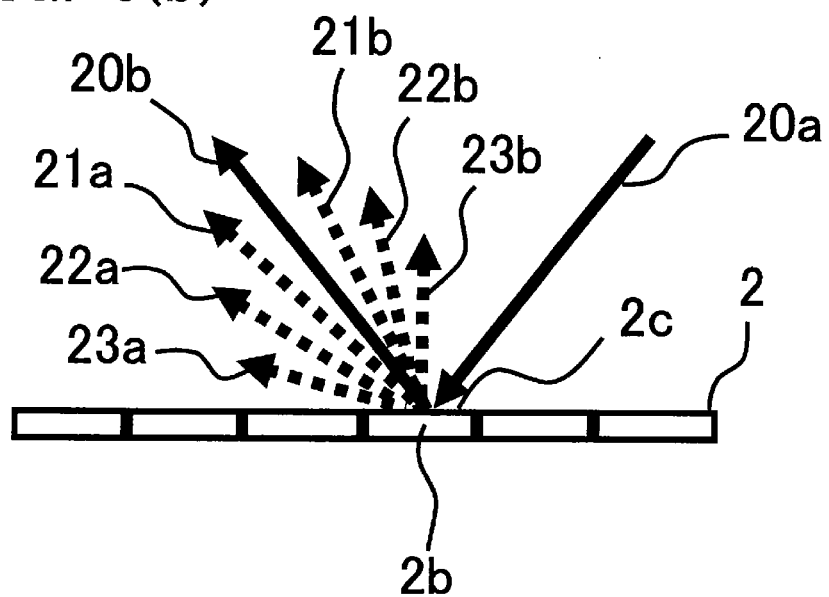

Light diffracted by a periodic structure such as the DMD element 2 will be described with reference to FIGS. 3(a) and 3(b). FIG. 3(a) shows a plurality of micromirrors in one part of the image formation region 2a of the DMD element 2. FIG. 3(b) indicates how the light is reflected when the DMD element 2 is viewed from the side. A ray 20a incident on the DMD element 2 is indicated by a solid arrow and diffracted light is indicated by dotted arrows.

Next, the behavior of the ray 20a when the ray is incident on one of the micromirrors 2b of the DMD element 2 will be described. When the ray 20a is reflected by the reflective surface 2c of the micromirror 2b, regularly reflected light 20b is output and diffracted light is generated. The regularly reflected light 20b is referred to as 0-order light, diffracted light 21a as 1st-order light, diffracted light 22a as 2nd-order light, and diffracted light 23a as 3rd-order light. Similarly, when the ray 20a is reflected by the reflective surface 2c, 4th-order light, 5th-order light, and further high-order light (not shown) are also generated. Diffracted light 21b is referred to as −1st-order light, diffracted light 22b as −2nd-order light, and diffracted light 23b as −3rd-order light. Similarly, when the ray 20a is reflected by the reflective surface 2c, −4th-order light, −5th-order light, and further high-order light (not shown) are also generated. It is known that the higher the order becomes, the smaller the intensity of the diffracted light becomes.

The angle pitch $\beta$ of the diffracted light 21a, 21b, 22a, 22b, 23a, and 23b is determined by the pixel spacing d of the DMD element 2, the incidence angle $\alpha$ of ray 20a, the diffraction order m, and the wavelength $\lambda$ as shown in Equation (1). The angle pitch $\beta$ is referred to as the diffraction angle pitch.

$$d(\sin \alpha \pm \sin \beta) = m\lambda \tag{1}$$

The results of calculation of the diffraction angle pitch $\beta$ for a constant incidence angle $\alpha$ when the pixel spacing d of the DMD element 2 is 13.7 μm and when the pixel spacing d is 7.6 μm, for example, are shown for different light wavelengths in FIG. 4. The light wavelengths $\lambda$ are 470 nm, 530 nm, and 630 nm. When the pixel spacing d is 13.7 μm, the diffraction angle pitch $\beta$ is 2.46° for a wavelength $\lambda$ of 630 nm (corresponding to red), 2.22° for a wavelength $\lambda$ of 530 nm (corresponding to green), and 1.97° for a wavelength $\lambda$ of 470 nm (corresponding to blue). When the pixel spacing d is 7.6 μm, the diffraction angle pitch $\beta$ is 4.75° for a wavelength $\lambda$ of 630 nm (corresponding to red), 4.00° for a wavelength $\lambda$ of 530 nm (corresponding to green), and 3.55° for a wavelength $\lambda$ of 470 nm (corresponding to blue). It can be seen that as the pixel spacing d is reduced, as from 13.7 μm to 7.6 μm, the diffraction angle pitch $\beta$ increases.

For the purposes of higher contrast, smaller size, and lower cost of the optics, a non-telecentric optical system is often used as the illumination optical system 4. With a non-telecentric optical system, the incidence angle of the light incident on the DMD element 2 generally differs depending on the position in the image formation region of the DMD element 2.

Figure 5:
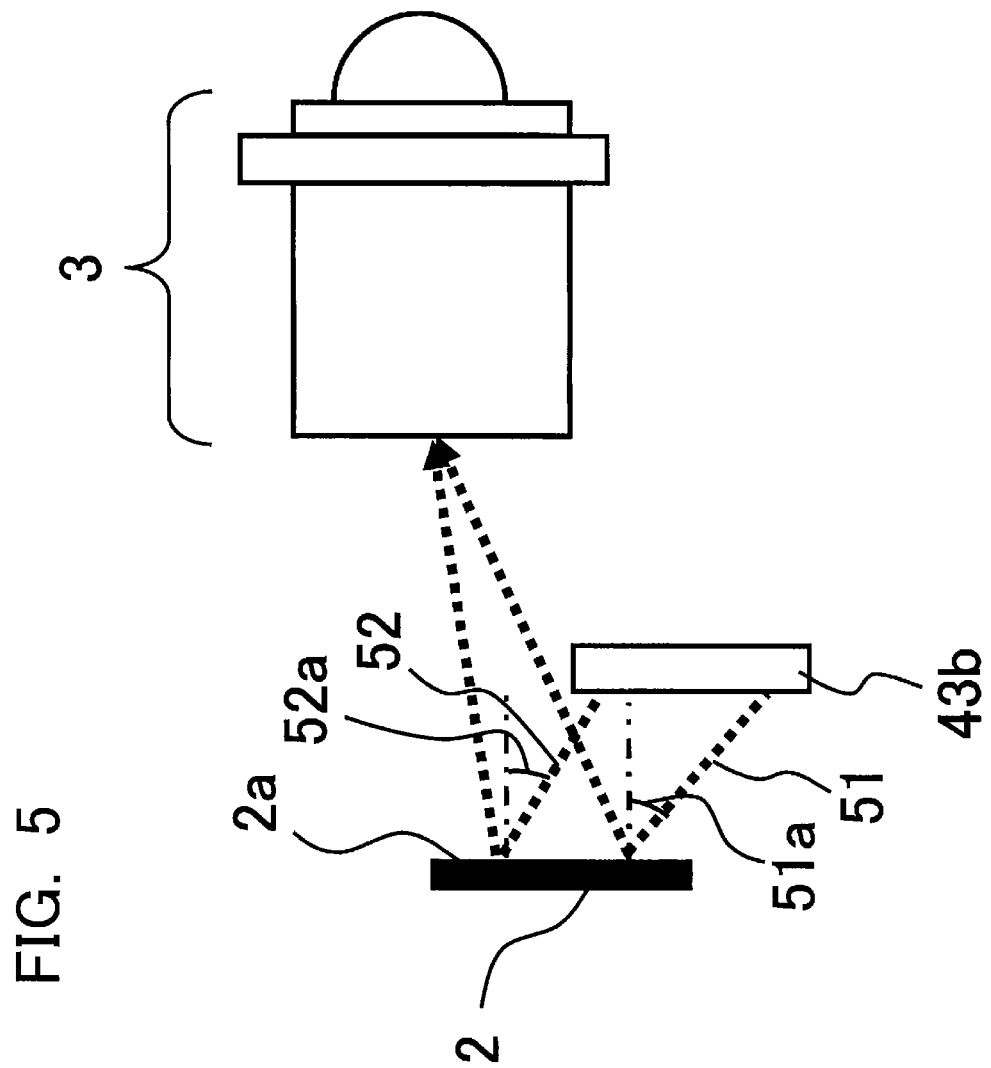
FIG. 5 is a schematic diagram showing an exemplary light beam entering the projection optical system in the first to third embodiments.

FIG. 5 compares the incidence angle 51a of a ray 51 incident on the lower part of the DMD element 2 and the incidence angle 52a of a ray 52 incident on the upper part of the DMD element 2. It can be seen that the incidence angle 51a of ray 51 is greater than the incidence angle 52a of ray 52. It is thus seen that especially in a non-telecentric optical system, there is a difference in the incidence angle α of light incident at different positions within the image formation region of the DMD element 2. Rays 51 and 52 are indicated by dotted arrows.

Figure 6:
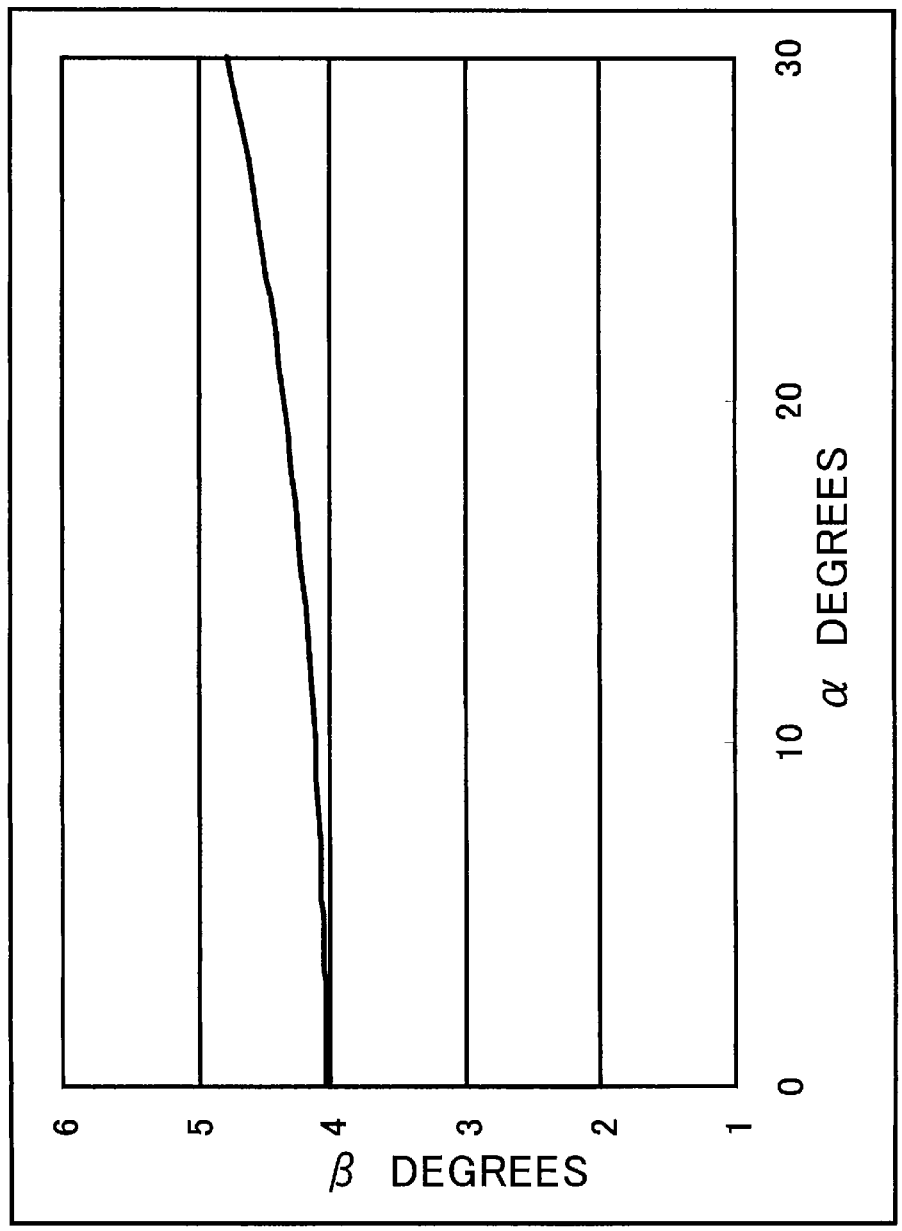
FIG. 6 shows a calculated example of the diffraction angle of the DMD in the first to third embodiments.

The difference in the incidence angle α of the light incident on the DMD element 2 also causes a difference in the regularly reflected light 20b shown in FIG. 3. FIG. 6 shows the change in the diffraction angle pitch β as the incidence angle α changes. The vertical axis in FIG. 6 indicates the value of the diffraction angle pitch β and the horizontal axis indicates the value of the incidence angle α. The diffraction angle pitch β was calculated on the basis of equation (1) with a pixel spacing d of 7.6 mm and a wavelength of 530 nm. As shown in FIG. 6, as the incidence angle α increases, the diffraction angle pitch β also increases. That is, the difference in the incidence angle α on the image formation region of the DMD element 2 also causes a difference in the diffraction angle pitch β.

Figure 7:
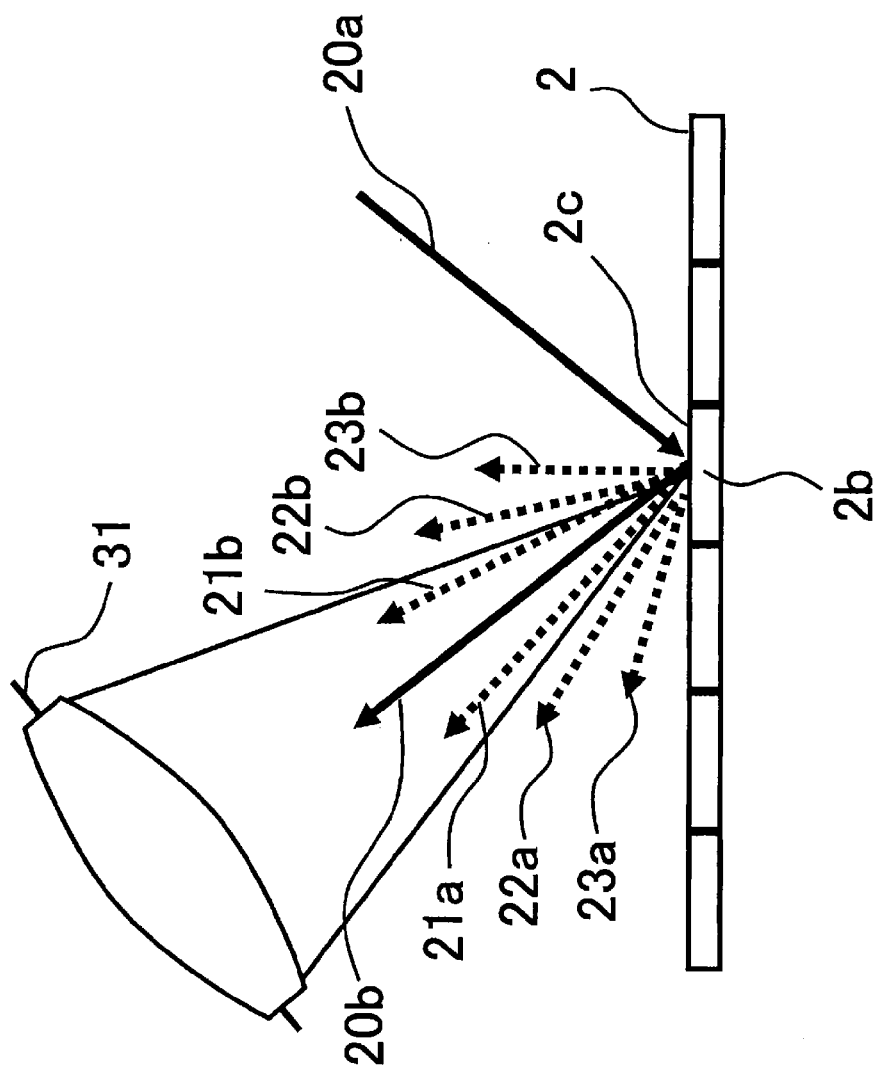
FIG. 7 is a schematic diagram illustrating light diffracted from the DMD in the first to third embodiments.

FIG. 7 is a conceptual drawing showing the light beam entering the entrance aperture 31 on the entrance side of the projection optical system 3. Ray 20a is indicated by a solid arrow; the diffracted light is indicated by dotted arrows. The size of the entrance aperture 31 on the entrance side of the projection optical system 3 is defined according to the value of the FNO of the projection optical system 3. That is, the larger the FNO of the projection optical system 3 is, the smaller the size of the entrance aperture 31 on the entrance side is. This means that the projection optical system 3 has a small aperture diameter. In contrast, the smaller the FNO of the projection optical system 3 is, the larger the entrance aperture 31 on the entrance side is. This means the projection optical system 3 has a large aperture diameter.

As shown in FIG. 7, ±1st-order diffracted light 21a, 21b enters the entrance aperture 31 on the entrance side of the projection optical system 3. It can be seen from FIG. 7, however, that 2nd- and higher-order diffracted light cannot enter the entrance aperture 31 on the entrance side of the projection optical system 3. It is found that if the size of the entrance aperture 31 on the entrance side of the projection optical system 3 is constant, then when the incidence angle α of the ray 20a changes, the amount of incident diffracted light also changes. This is because the orders of diffracted light entering the entrance aperture 31 on the entrance side differ between the positive and negative sides.

Conversely, if the size of the entrance aperture 31 on the entrance side changes, then even if the incidence angle α is unchanged, the amount of diffracted light incident on the entrance aperture 31 on the entrance side of the projection optical system 3 changes. A change in the size of the entrance aperture 31 on the entrance side means a change in the FNO of the projection optical system 3. As can be seen from FIG. 7, increasing the FNO of the projection optical system 3 in order to obtain higher contrast reduces the amount of incident diffracted light. This is because reducing the size of the entrance aperture 31 on the entrance side prevents high-order diffracted light from entering the entrance aperture 31 on the entrance side.

Owing to these various factors, the amount of light in the beam incident on the entrance aperture 31 on the entrance side of the projection optical system 3 from the image formation region 2a of the DMD element 2 often becomes uneven. Examples include cases in which there are differences in the angle of incidence of the light beam on the image formation region 2a of the DMD element 2 due to optical aberration or configuration effects, cases in which the FNO of the projection optical system 3 is increased, and cases in which the spacing of the DMD element 2 is narrowed. When the amount of light in the beam incident on the entrance aperture 31 on the entrance side of the projection optical system 3 from the image formation region 2a of the DMD element 2 is uneven, uneven illuminance or uneven color occurs, which degrades the image displayed on the image display surface of the screen 5.

A method of reducing the illuminance or color unevenness on the image display surface of the screen 5 will now be described. The image display surface of the screen 5 is segmented and the illuminance distribution over the segments is confirmed by measurement or simulation etc. In the example shown in FIG. 8, the image display surface of the screen 5 is segmented into nine regions. Instead of segmenting the image display surface of the screen 5 into nine regions, it is also possible to segment the image formation region 2a of the DMD element 2 into nine regions. Furthermore, the plurality of segments need not form three columns and three rows of regions; the regions may be aligned in M columns and N rows, where M and N are integers equal to or greater than two.

Figure 9:
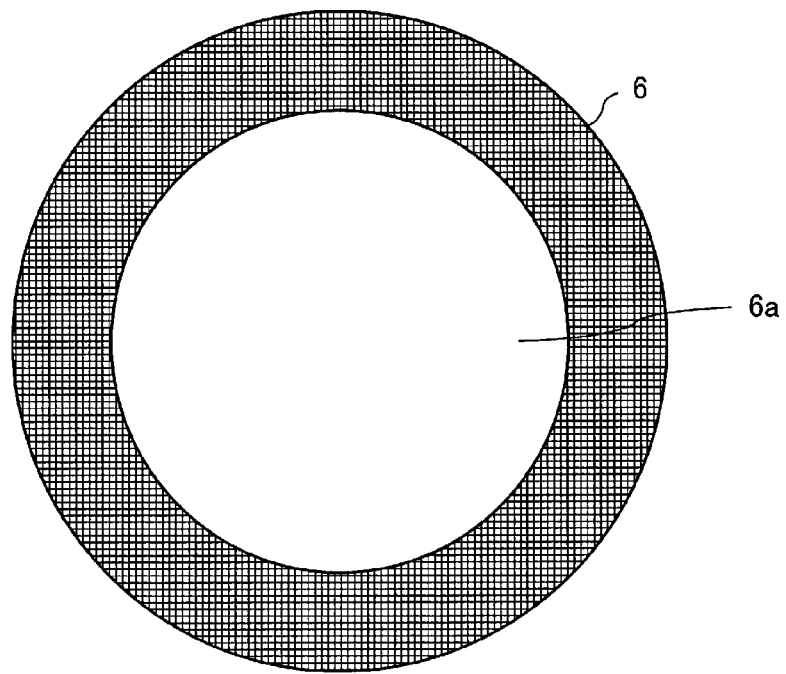
FIG. 9 is a frontal view showing the shape of an aperture regulation member in a comparative example.

FIG. 9 is a schematic drawing showing the shape of the aperture section 6a of the aperture regulation member 6. A general aperture regulation member such as the aperture regulation member 6 shown in FIG. 9 controls the flux of the illumination light beam by regulating the diameter of the illumination light beam with a circular aperture section 6a.

Figure 10:
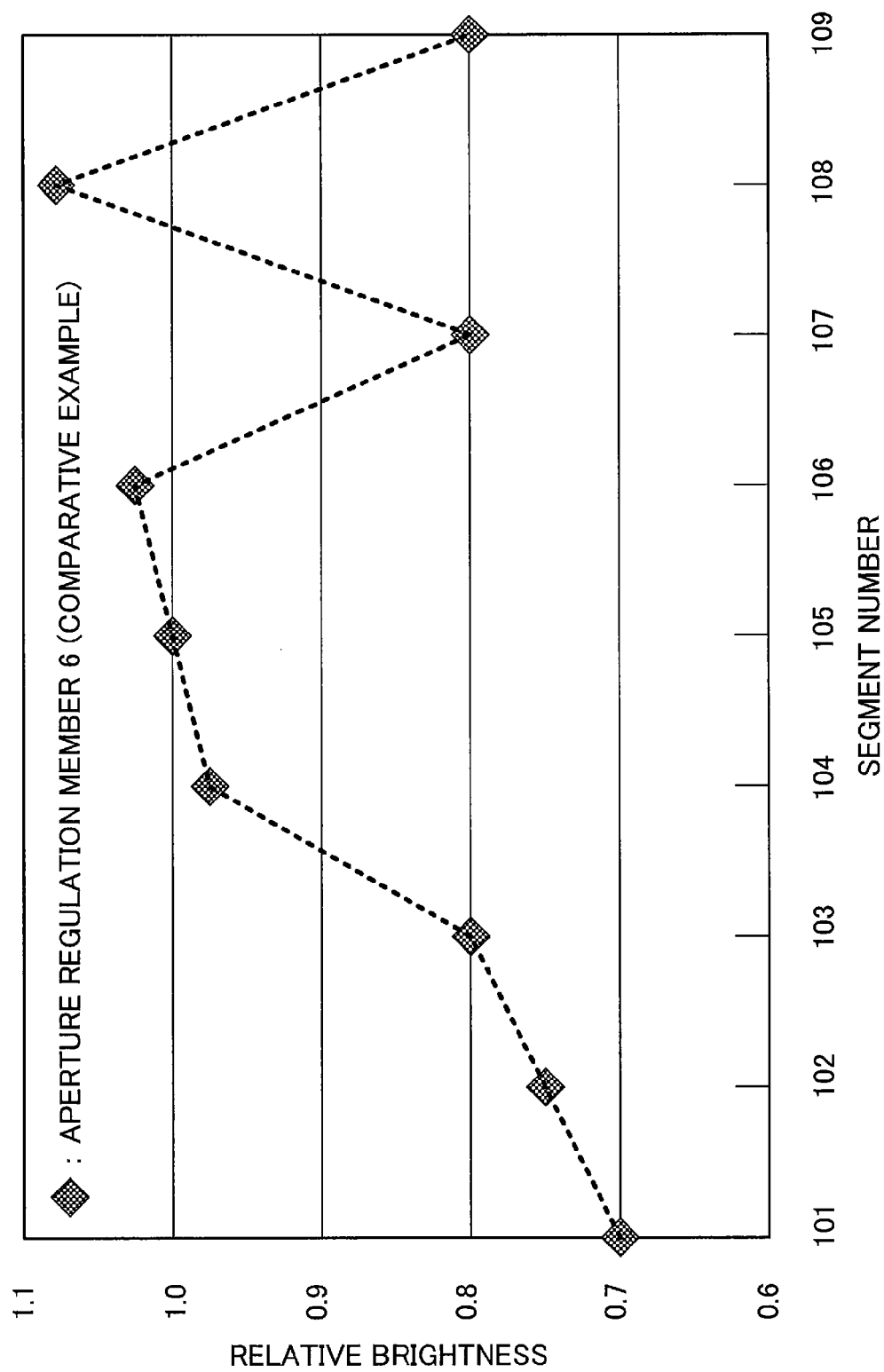
FIG. 10 shows the brightness characteristic of the image display surface of the screen when the aperture regulation member in the comparative example is used.

An example of the resulting illuminance distribution when the image display surface of the screen 5 is segmented into nine regions is shown in FIG. 10. FIG. 10 shows the relative brightness of each segment with respect to the center (segment 105 in FIG. 8) of the image display surface on the screen 5. The vertical axis indicates the relative brightness and the horizontal axis indicates segments of the image display surface on the screen 5. It is contemplated that the relative brightness may be a value indicating illuminance, luminance, design brightness, or the like; in the first embodiment it indicates illuminance. In order to describe illuminance unevenness, a brightness characteristic is shown here, but the same idea may also be applied in regard to chromaticity, with isochromaticity characteristics.

FIG. 10 shows the brightness on the image display surface of the screen 5 with respect to the segment 105 at the center of the image display surface of the screen 5 by using relative values. In segment 101 in FIG. 8, the relative value of the brightness is 0.7; in segment 102, the relative value of the brightness is 0.75; in segment 103, the relative value of the brightness is 0.8. Thus it can be seen from FIG. 10 that the degree of unevenness of the brightness on the image display surface of the screen 5 is large.

The method of overcoming the illumination unevenness shown in FIG. 10 on the image display surface of the screen 5 will now be described. As shown in FIG. 2, the DMD element 2 and the exit plane 41b of the light-intensity equalization element 41 are in an optically conjugate relation. Accordingly, if a structure is provided such that the uneven illuminance unevenness is corrected near the exit plane 41b of the light-intensity equalization element 41, a defect such as a shadow (dark portion) due to an incomplete light beam in the image formation region 2a on the DMD element 2 will be displayed.

Conversely, the entrance aperture 31 on the entrance side of the projection optical system 3 and the baffle position 45 of the illumination optical system 4 are not in an optically conjugate relation with the screen 5. The baffle position 45 of the illumination optical system 4 is conjugate with the entrance aperture 31 on the entrance side. Accordingly, even if a structure is provided at these positions to correct the illumination unevenness, it is possible to control the amount of light without having defects such as shadows (dark portions) displayed on the image display surface of the screen 5 because of an incomplete light beam.

For example, in order to overcome the illuminance unevenness on the image display surface of the screen 5, let the aperture regulation member 6 be disposed in the vicinity of the baffle position 45 of the illumination optical system 4. The shape of the aperture regulation member 6 will now be considered.

Figure 11:
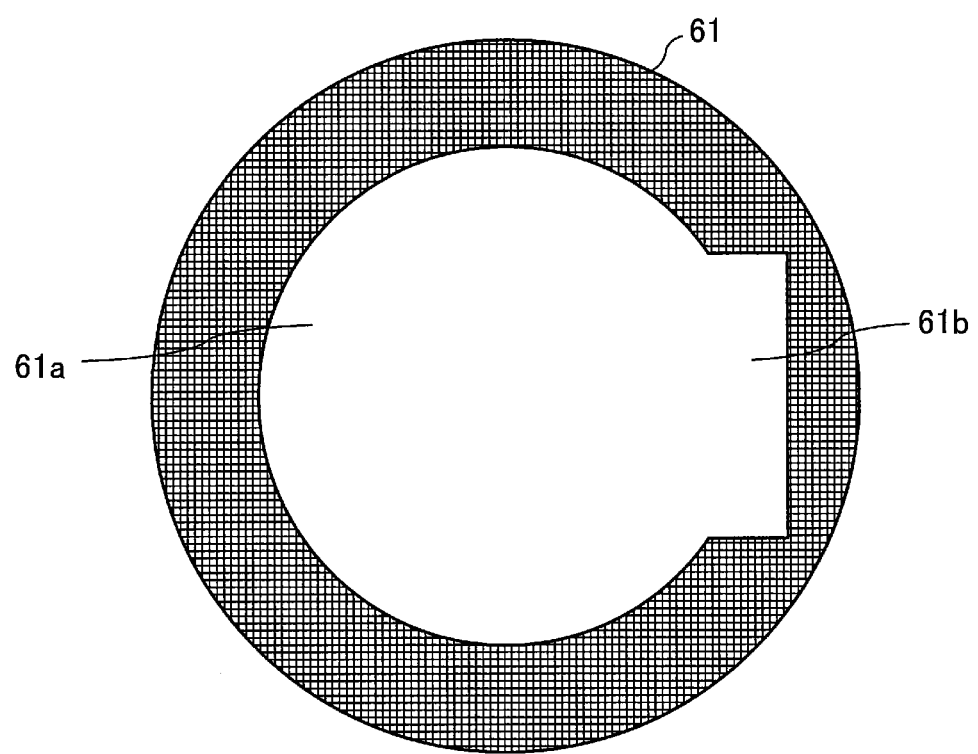
FIG. 11 is a frontal view showing the shape of an aperture regulation member in the first embodiment.

FIG. 11 shows an aperture regulation member 61 that improves on the aperture regulation member 6 in FIG. 9. FIG. 11 shows an aperture regulation member 61 for overcoming illuminance unevenness on the image display surface of the screen 5. FIG. 11 is a schematic drawing illustrating the shape of the aperture section 61a of the aperture regulation member 61. The aperture regulation member 61 does not have a circular shape like that of the aperture section 6a shown in FIG. 9; it is shaped to correct illuminance unevenness or color unevenness on the image display surface of the screen 5. That is, it has a rectangular aperture region (cutout) 61b disposed on the right side in FIG. 11.

The region in the aperture section 61a having a large effect on the amount of light particularly in the segments 101, 102, and 103 with low relative brightness (a small amount of light) corresponds to the rectangular aperture region 61b shown in FIG. 11. As the amount of light in segments 101, 102, and 103 is small, the aperture regulation member 61 is shaped corresponding to segments 101, 102, and 103. For example, the rectangular aperture region 61b is newly provided. That is, a rectangular aperture region 61b is added to the circular region of the aperture section 61a of the aperture regulation member 61, thereby letting a larger amount of light through.

Figure 12:
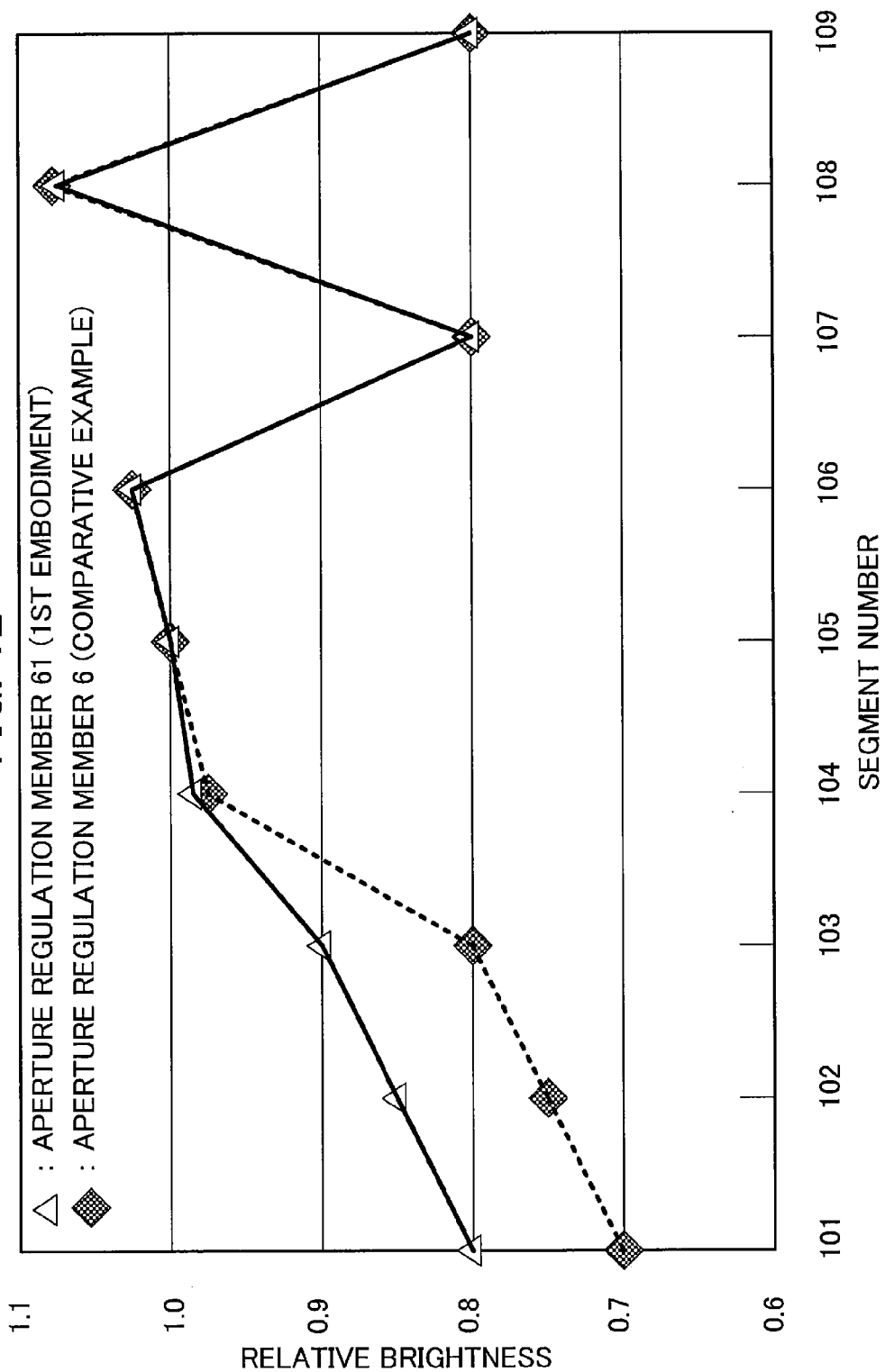
FIG. 12 shows the brightness characteristic of the image display surface of the screen in the first embodiment.

FIG. 12 shows the illuminance distribution on the image display surface of the screen 5 when aperture regulation member 61 is employed. In FIG. 12, the vertical axis indicates relative brightness and the horizontal axis indicates segments on the image display surface of the screen 5. The rhombic points indicate values when aperture regulation member 6 is used and the triangular points indicate values when aperture regulation member 61 is used. Relative brightness is measured by the same method as in FIG. 8. In FIG. 12 it can be seen that, in comparison with the case in which the aperture regulation member 6 having a circular aperture is deployed, aperture regulation member 61 increases the amount of light on segments 101, 102, and 103 on the image display surface of the screen 5, so the illuminance distribution on the image display surface is improved.

In order to correct luminance unevenness or color unevenness on the image display surface of the screen 5, the projection display device according to the first embodiment places an aperture regulation member 6 or 61 that regulates the aperture on the light propagation path near a position conjugate with the entrance aperture 31 on the entrance side of the projection optical system. The aperture regulation member 6 or 61 is shaped to correct the illuminance distribution on the image display surface of the screen 5. If the aperture regulation member 6 or 61 is placed at this position its size can be reduced. It is also possible to correct the illuminance distribution on the image display surface of the screen 5 with reduced degradation in light utilization efficiency.

The reason for placing the aperture regulation member 6 or 61 in a vicinity of the position conjugate with the entrance aperture 31 on the entrance side of the projection optical system is that in some cases, in consideration of structures such as lens frames, the aperture regulation member cannot be placed at the conjugate position. In some designs, the aperture regulation member 6 or 61 must therefore be disposed away from the conjugate position, within a range in which it will not cause harm. Taking FIG. 1 for example, in some optical system designs it is difficult to place the aperture regulation member 6 or 61 at the conjugate position in consideration of the lens frames of the relay lens group 42 of the illumination optical system 4 because the conjugate position is very near the exit surface of the relay lens group 42. Depending on the optical system design, the conjugate position may be on the exit side of the mirror group 43, and in this case as well, it may be necessary to move the position of the aperture regulation member 6 or 61 because of interference with the retaining parts of the mirror group 43.

Therefore, an effect obtained from the projection display device according to the first embodiment is to make it possible to configure the optical systems at low cost with a simple structure and to display good images with reduced illuminance unevenness or color unevenness on the image display surface of the screen 5. Another effect obtained from the projection display device according to the first embodiment is to facilitate downsizing of the optics. Incidentally, the illuminance distribution is a distribution indicating degrees of illumination in positions represented two-dimensionally on an arbitrary plane.

As described above, by placing the aperture regulation member 6 for adjusting the amount of projection light near the baffle position 45 of the illumination optical system 4, the projection display device according to the first embodiment prevents the occurrence of defects such as the display of shadows (dark portions) due to an incomplete light beam in the image formation region 2a of the DMD element 2.

The projection display device according to the first embodiment varies the shape of the aperture regulation member 6 or 61 so as to correct the illumination unevenness or color unevenness on the image display surface of the screen 5, which enables favorable correction of the illumination unevenness or color unevenness on the image display surface of the screen 5. Favorable correction of illumination unevenness or color unevenness on the image display surface of the screen 5 can thus be obtained using a compact aperture regulation member 6, 61 that is low in cost.

Second Embodiment

An aperture regulation member 62 that further improves the illuminance distribution (FIG. 12) obtained by use of the aperture regulation member 61 (FIG. 11) in the first embodiment will be described in the second embodiment. Segment 107 shown in FIG. 8 has less light than the other segments. An aperture section 62a for improving segment 107 will now be considered.

Figure 13:
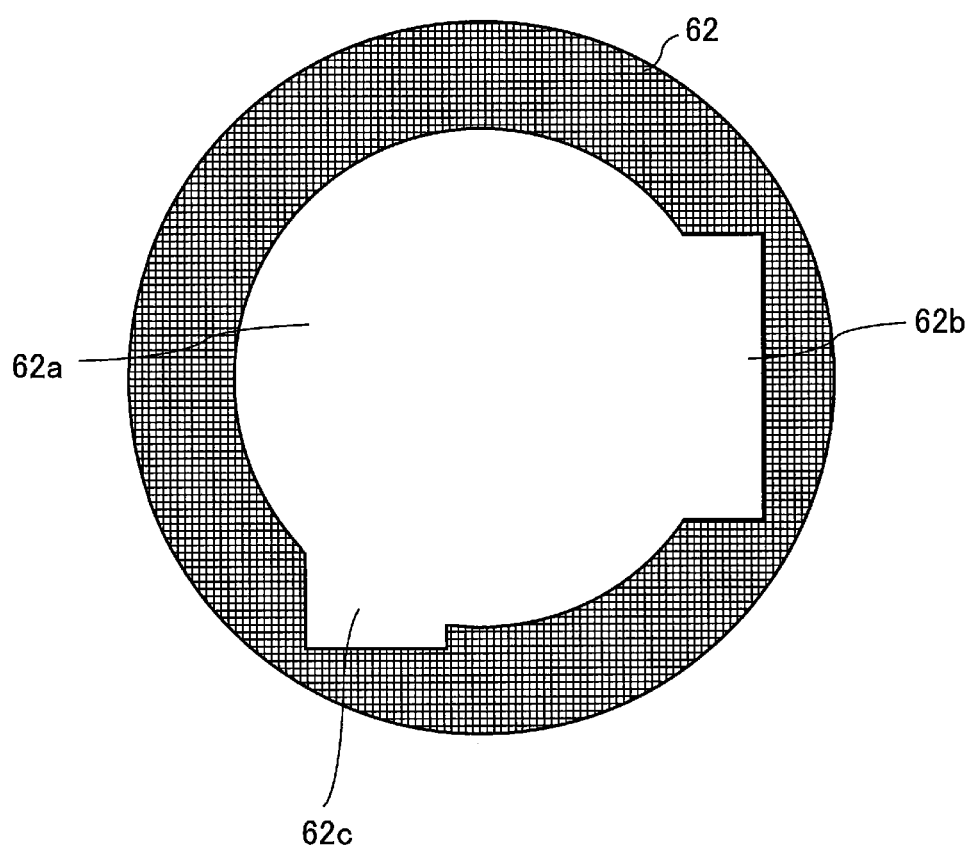
FIG. 13 is a frontal view showing the shape of an aperture regulation member in the second embodiment.

FIG. 13 is a frontal view showing the shape of the aperture section 62a of the aperture regulation member 62. In FIG. 13, in addition to aperture region 61b in aperture regulation member 61, the aperture section 62a of aperture regulation member 62 has a rectangular aperture region 62c. This aperture region 62c corresponds to segment 107 on the image display surface of the screen 5.

Figure 14:
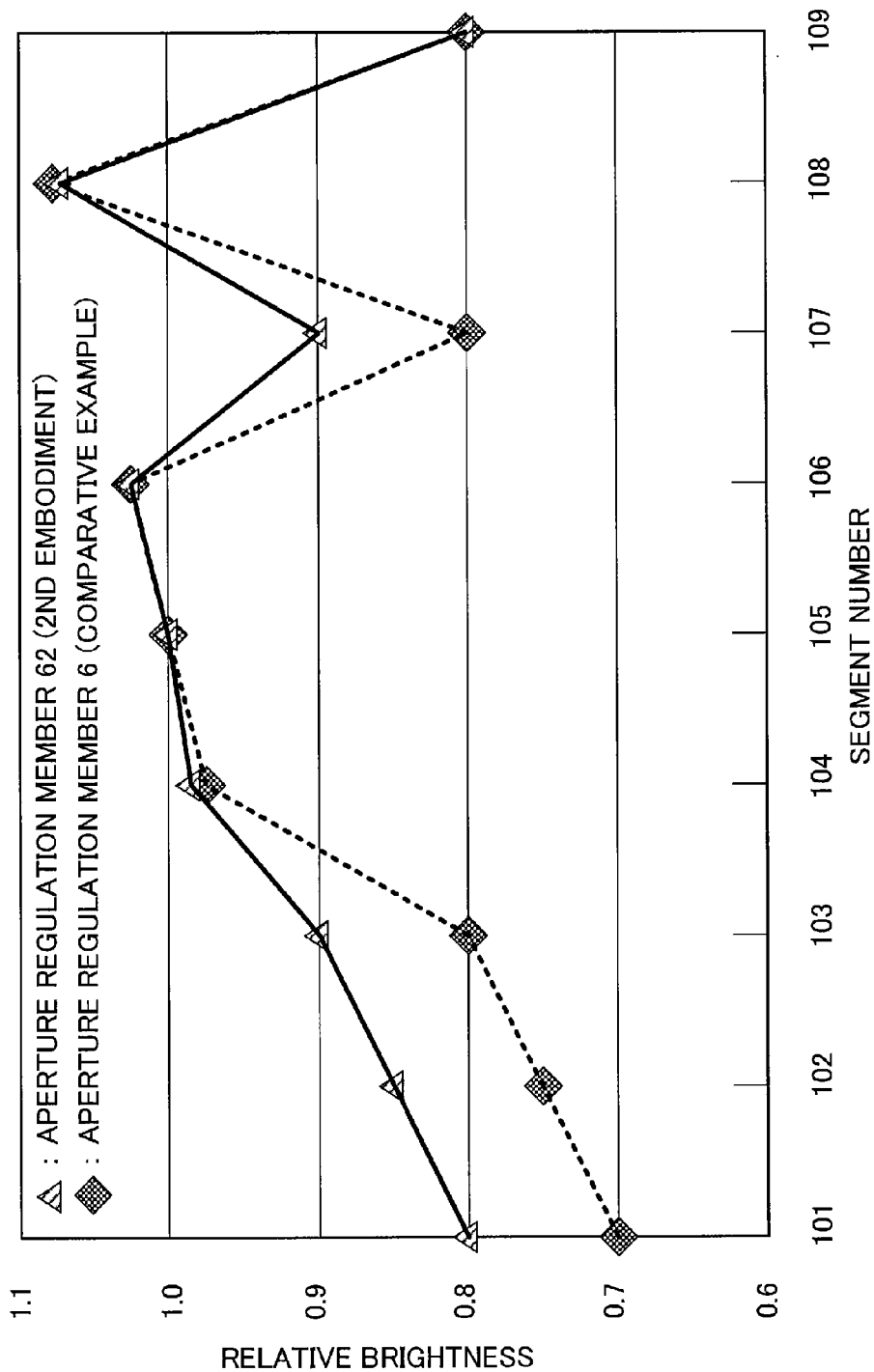
FIG. 14 shows the brightness characteristic of the image display surface of the screen in the second embodiment.

FIG. 14 shows the illuminance distribution on the image display surface of the screen 5 when aperture regulation member 62 is employed. The vertical axis indicates relative brightness and the horizontal axis indicates segments on the image display surface on the screen 5. The rhombic points indicate values when aperture regulation member 6 is used and the triangular points indicate values when aperture regulation member 62 is used. In FIG. 14 it can be seen that, in comparison with the case in which aperture regulation member 61 is used, the amount of light on segment 107 in the image display surface of the screen 5 is increased and the illuminance distribution on the image display surface is improved.

In order to correct luminance unevenness or color unevenness on the image display surface of the screen 5, the projection display device according to the second embodiment deploys an aperture regulation member 62 that regulates the aperture. The aperture regulation member 62 is shaped to correct the illuminance distribution on the image display surface of the screen 5. The aperture regulation member 62 can be reduced in size by, for example, placing a cutout 62b in the aperture regulation member 62 corresponding to a relatively dark region of the screen 5 as seen from the front. It is also possible to correct the illuminance distribution on the image display surface of the screen 5 with reduced degradation in light utilization efficiency.

Third Embodiment

Figure 15:
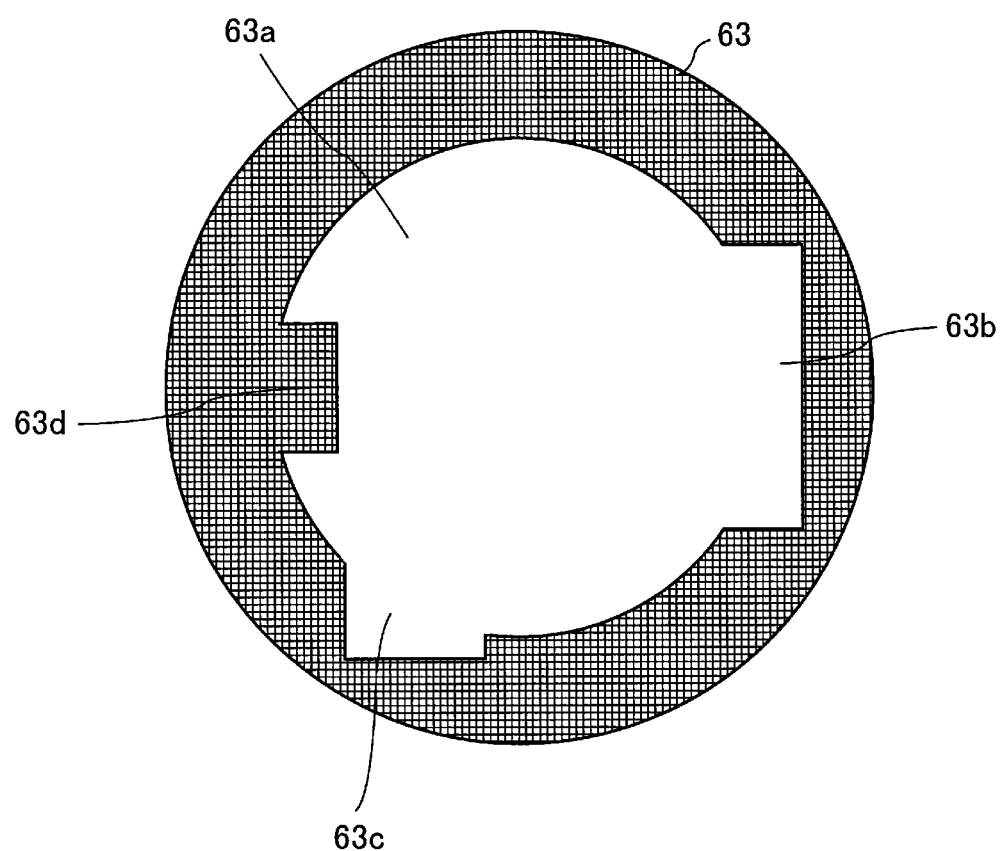
FIG. 15 is a frontal view schematically showing the shape of an aperture regulation member in the third embodiment.

An aperture regulation member 63 that further improves the illuminance distribution (FIG. 14) obtained by use of the aperture regulation member 62 (FIG. 13) in the second embodiment will be described in the third embodiment. As shown in FIG. 14, in the second embodiment the relative brightness of segment 108 is brighter than the relative brightness of the other segments. The aperture regulation member 63 in the third embodiment has a shape that can reduce the relative brightness of segment 108. FIG. 15 is a frontal view schematically showing the shape of the aperture section 63a of the aperture regulation member 63 in the third embodiment. The aperture section 63a of the aperture regulation member 63 shown in FIG. 15 is shaped with a protrusion that blocks light in an area 63d of the aperture regulation member 63 corresponding to segment 108 of the image display surface of the screen 5.

Figure 16:
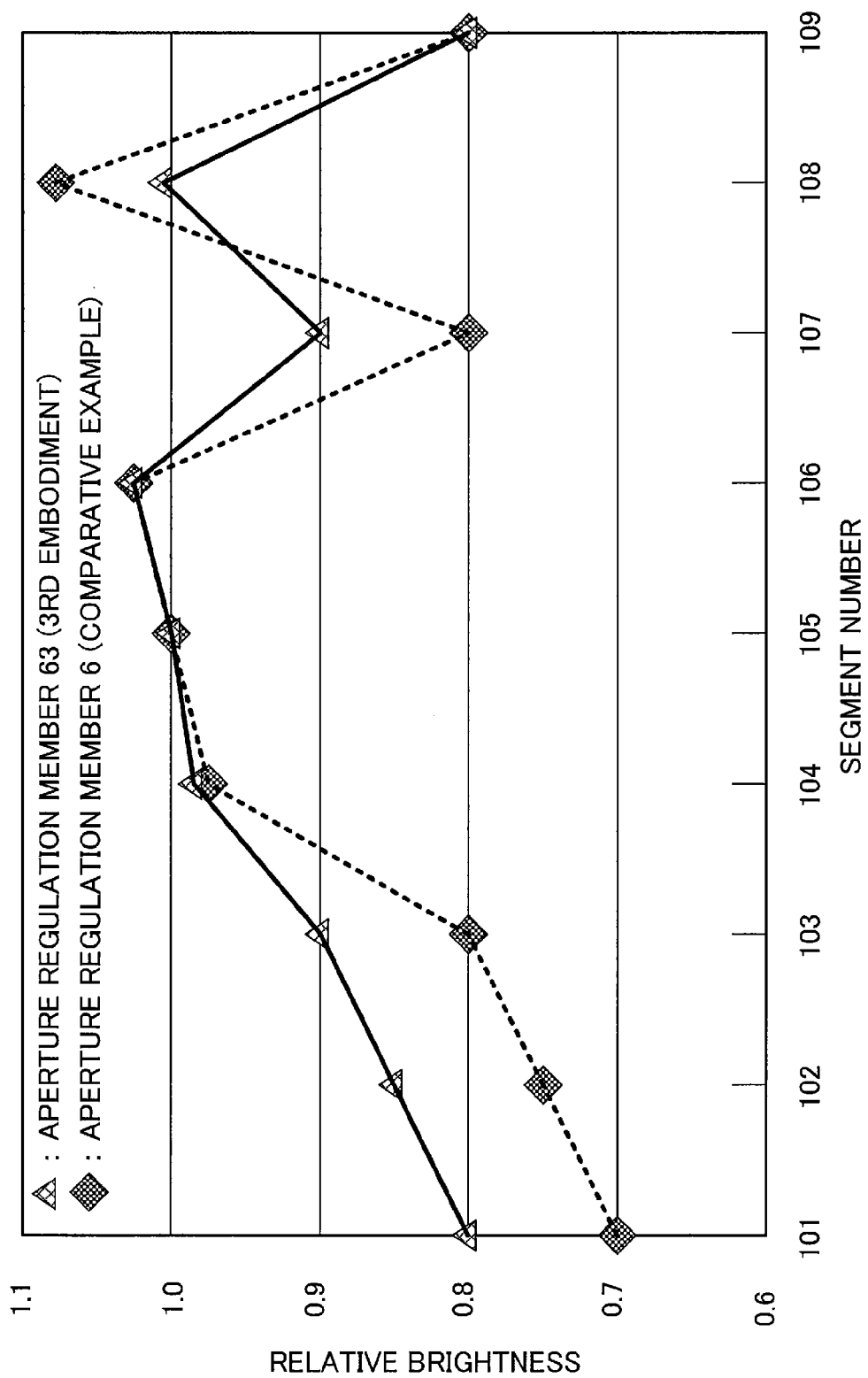
FIG. 16 shows the brightness characteristic of the image display surface of the screen in the third embodiment.

FIG. 16 shows the illuminance distribution on the image display surface of the screen 5 when aperture regulation member 63 is used. The vertical axis indicates relative brightness and the horizontal axis indicates segments on the image display surface on the screen 5. The rhombic points indicate values when aperture regulation member 6 is used and the triangular points indicate values when aperture regulation member 63 is used. In FIG. 16 it can be seen that, in comparison with the case in which aperture regulation member 61 is used, the amount of light on segment 108 in the image display surface of the screen 5 is reduced and the illuminance distribution on the image display surface is further improved.

In order to correct luminance unevenness or color unevenness on the image display surface of the screen 5, the projection display device according to the third embodiment places an aperture regulation member 63 that regulates the aperture on the optical propagation path near a position conjugate with the entrance aperture 31 on the entrance side of the projection optical system. The aperture regulation member 63 is shaped to correct the illuminance distribution on the image display surface of the screen 5. If the aperture regulation member 63 is placed at this position it can be made smaller. It is also possible to correct the illuminance distribution on the image display surface of the screen 5 with reduced degradation in light utilization efficiency.

Variations

In the description of the first to third embodiments above, a DMD element was used as the light valve, but other light valves, such as liquid crystal display elements of the transmissive or reflective type, may be used instead.

In the description of the first to third embodiments above, the cutouts and protrusions of the aperture regulation members 61, 62, 63 were rectangular, but non-rectangular shapes such as shapes including curves may also be used, provided they are adapted to the structure, arrangement, and characteristics of the illumination optical system so as to improve the illuminance evenness.

In the description of the first to third embodiments above, cutouts and protrusions are added to circular aperture sections, but cutouts and protrusions may be added to elliptical aperture sections and other non-circular aperture sections, provided they are adapted to the structure, arrangement, and characteristics of the illumination optical system and have shapes that improve the illuminance evenness.

In the first to third embodiments above, terms such as 'parallel' and 'perpendicular' have been used to indicate positional relationships among components or shapes of components, and expressions including words such as 'substantially' or 'about', such as substantially square, about 90 degrees, and substantially parallel, have been used. The ranges represented thereby allow for production tolerances, assembly variability, and the like. Therefore, even when the claim language includes expressions lacking the term 'substantially', for example, these expressions designate ranges that allow for production tolerances, assembly variability, and the like. When the term 'substantially' is used in the claim language it indicates a range including allowances for production tolerances, assembly variability, and the like.

EXPLANATION OF REFERENCE CHARACTERS 1 source lamp (light source); 11a light emitting element; 11b elliptical mirror; 2 DMD (light valve); 2a illuminated surface (image formation region); 2b micromirror; 2c reflective surface; 20a ray; 20b regularly reflected light; 21a, 21b, 22a, 22b, 23, 23b diffracted light; 3 projection optical system; 31 entrance aperture; 4 illumination optical system; 41 light-intensity equalization element; 41a entrance plane; 41b exit plane; 42 relay lens group (second optical system); 42a, 42b lens; 43 mirror group (third optical system); 43a first mirror; 43b second mirror; 45 baffle position of illumination optical system; 5 screen; 51, 52 ray; 51a, 52a incidence angle; 101, 102, 103, 104, 105, 106, 107, 108, 109 region (segment); 6, 61, 62, 63 aperture regulation member; 6a, 61a, 62a, 63a aperture section; 61b, 62b, 62c, 63b, 63c aperture region (cutout, aperture expansion part); 63d light blocking region (protrusion, aperture contraction part); d pixel spacing; $\alpha$ incidence angle; $\beta$ diffraction angle pitch; m diffraction order; $\lambda$ wavelength.

What is claimed is:

1. A projection display device comprising:
a light source for emitting a light beam;
a light valve having an image formation region for forming an image responsive to input image information;

an illumination optical system for directing the light beam onto the image formation region of the light valve;

and a projection optical system for projecting the light beam, as modulated by the image formed in the image formation region of the light valve, onto an image display surface of a screen; wherein the illumination optical system includes a light intensity equalization element for equalizing an intensity distribution of the light beam emitted from the light source, a first optical system for guiding the light beam equalized by the light intensity equalization element to the image formation region, and an aperture regulation member provided on a path of propagation of the light beam in the first optical system, having a light blocking section for blocking the light beam and an aperture section for passing the light beam; and the aperture regulation member is disposed in a position not having an optically conjugate relation to the screen, and has at least one of an aperture expansion part provided at a position corresponding to a segment of relatively low illuminance, among a plurality of segments obtained by partitioning the image formation region or the image display surface of the screen, using measured or calculated relative illuminance values, the aperture expansion part being a cutout region that narrows the light blocking section and widens the aperture section, and an aperture contraction part provided at a position corresponding to a segment of relatively high illuminance, among the plurality of segments, the aperture contraction part being a protrusion that widens the light-blocking section and narrows the aperture section.

2. The projection display device of claim 1, wherein the aperture regulation member is disposed at or in a vicinity of a position conjugate to a projection optics aperture on a light beam entrance side of the projection optical system.

3. The projection display device of claim 1, wherein the aperture section has a shape that, prior to widening by the aperture expansion part and narrowing by the aperture contraction part, is round.

4. The projection display device of claim 1, wherein the plurality of segments are a plurality of regions aligned in M columns and N rows, M and N being integers equal to or greater than two.

5. The projection display device of claim 1, wherein the light valve has a plurality of movable micromirrors with respective reflecting surfaces having tilt angles that are switched responsive to the input image information.

6. The projection display device of claim 1, wherein the light valve is a liquid crystal light valve that modulates the light beam responsive to the input image information.

7. A projection display device comprising:
a light source for emitting a light beam;
a light valve having an image formation region for forming an image responsive to input image information;
an illumination optical system for directing the light beam onto the image formation region of the light valve;
and a projection optical system for projecting the light beam, as modulated by the image formed in the image formation region of the light valve, onto an image display surface of a screen; wherein
the illumination optical system includes a light intensity equalization element for equalizing an intensity distribution of the light beam emitted from the light source, a first optical system for guiding the light beam equalized by the light intensity equalization element to the image formation region, and an aperture regulation member provided on a path of propagation of the light beam in the first optical system, having a light blocking section for blocking the light beam and an aperture section for passing the light beam; and the aperture regulation member is disposed in a position not having an optically conjugate relation to the screen, and has at least one of an aperture expansion part provided at a position corresponding to a segment of relatively low illuminance, among a plurality of segments obtained by partitioning the image formation region or the image display surface of the screen, using measured or calculated relative illuminance values, the aperture expansion part being a cutout region that narrows the light blocking section and widens the aperture section, and an aperture contraction part provided at a position corresponding to a segment of relatively high illuminance, among the plurality of segments the aperture contraction part being a protrusion that widens the light-blocking section and narrows the aperture section, the aperture expansion part is a cutout region extending outward from an inner circumference of the light blocking section, and the aperture contraction part is a region protruding inward from the inner circumference of the light blocking section.

8. A projection display device comprising:
a light source for emitting a light beam;
a light valve having an image formation region for forming an image responsive to input image information;
an illumination optical system for directing the light beam onto the image formation region of the light valve;
and a projection optical system for projecting the light beam, as modulated by the image formed in the image formation region of the light valve, onto an image display surface of a screen; wherein
the illumination optical system includes a light intensity equalization element for equalizing an intensity distribution of the light beam emitted from the light source, a first optical system for guiding the light beam equalized by the light intensity equalization element to the image formation region, and an aperture regulation member provided on a path of propagation of the light beam in the first optical system, having a light blocking section for blocking the light beam and an aperture section for passing the light beam; and the aperture regulation member is disposed in a position not having an optically conjugate relation to the screen, and has at least one of an aperture expansion part provided at a position corresponding to a segment of relatively low illuminance, among a plurality of segments obtained by partitioning the image formation region or the image display surface of the screen, using measured or calculated relative illuminance values, the aperture expansion part being a cutout region that narrows the light blocking section and widens the aperture section, and an aperture contraction part provided at a position corresponding to a segment of relatively high illuminance, among the plurality of segments, the aperture contraction part being a protrusion that widens the light-blocking section and narrows the aperture section, the first optical system includes:

a second optical system for changing the diameter of the light beam; and a third optical system for changing the direction of the light beam; and the aperture regulation member is disposed in one of a position between the second optical system and the third optical system, a position within the second optical system, and a position within the third optical system.

* * * * *